United States Patent
Zalewski et al.

(10) Patent No.: US 10,405,294 B2
(45) Date of Patent: Sep. 3, 2019

(54) TIME STAMP GENERATION WITHOUT GNSS SIGNAL

(71) Applicant: Continental Teves AG & Co. oHG, Frankfurt (DE)

(72) Inventors: Michael Zalewski, Frankfurt am Main (DE); Richard Scherping, Liederbach am Taunus (DE); Sven Kretschmar, Gustavsburg (DE); Nils Bauch, Idstein (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 315 days.

(21) Appl. No.: 15/307,939

(22) PCT Filed: Apr. 9, 2015

(86) PCT No.: PCT/EP2015/057671
§ 371 (c)(1),
(2) Date: Mar. 1, 2017

(87) PCT Pub. No.: WO2015/165704
PCT Pub. Date: Nov. 5, 2015

(65) Prior Publication Data
US 2017/0280416 A1    Sep. 28, 2017

(30) Foreign Application Priority Data
Apr. 30, 2014   (DE) .................. 10 2014 208 266

(51) Int. Cl.
*G01S 19/33* (2010.01)
*G01S 19/46* (2010.01)
(Continued)

(52) U.S. Cl.
CPC ............ *H04W 64/006* (2013.01); *G01S 19/46* (2013.01); *H04L 43/106* (2013.01); *H04W 4/02* (2013.01);
(Continued)

(58) Field of Classification Search
CPC ....... G01S 19/33; G01S 19/46; H04L 43/106; H04W 4/02; H04W 4/80; H04W 64/006
(Continued)

(56) References Cited

U.S. PATENT DOCUMENTS

| 2004/0189515 A1* | 9/2004 | Vannucci | ................ G01S 19/03 |
| | | | 342/357.29 |
| 2010/0003946 A1* | 1/2010 | Ray | ........................ G10L 13/043 |
| | | | 455/404.1 |
| 2010/0204918 A1 | 8/2010 | Joo et al. | |

FOREIGN PATENT DOCUMENTS

| CN | 102308643 A | 1/2012 |
| CN | 103069299 A | 4/2013 |

(Continued)

OTHER PUBLICATIONS

International Search Report and Written Opinion dated Jul. 2, 2015 from corresponding International Patent Application No. PCT/EP2015/057671.
(Continued)

*Primary Examiner* — Dao L Phan

(57) ABSTRACT

The disclosure relates to a method for generating a time stamp in a vehicle which participates in a vehicle ad-hoc network. The method includes associating, by giving out the time stamp, an event, which is transmitted in a message, with a clock time. The clock time is generated by updating a global time base that may be derived from a global satellite navigation signal (GNSS). The method includes checking whether a GNSS signal may be received. The method also includes generating the clock time based on a local time base
(Continued)

if an insufficient number of global satellite navigation signals for deriving the global time base is available.

18 Claims, 4 Drawing Sheets

(51) Int. Cl.
| | |
|---|---|
| *H04W 64/00* | (2009.01) |
| *H04W 4/80* | (2018.01) |
| *H04W 4/02* | (2018.01) |
| *H04L 12/26* | (2006.01) |
| *H04W 4/46* | (2018.01) |
| *H04W 4/44* | (2018.01) |
| *H04W 84/18* | (2009.01) |

(52) U.S. Cl.
CPC ............... *H04W 4/44* (2018.02); *H04W 4/46* (2018.02); *H04W 4/80* (2018.02); *H04W 84/18* (2013.01)

(58) Field of Classification Search
USPC .................................................... 342/357.73
See application file for complete search history.

(56) References Cited

FOREIGN PATENT DOCUMENTS

| | | |
|---|---|---|
| DE | 102009045748 A1 | 4/2011 |
| DE | 102012216192 A1 | 3/2013 |
| WO | WO2014027072 A1 | 2/2014 |

OTHER PUBLICATIONS

German Search Report dated Nov. 24, 2017 for corresponding German Patent Application No. 10 2014 208 266.8.
Chinese First Office Action dated May 29, 2019 for corresponding Chinese application No. 201580022763.9.

* cited by examiner

# TIME STAMP GENERATION WITHOUT GNSS SIGNAL

TECHNICAL FIELD

The invention relates to a method for providing a time stamp, to a control device for implementing the method and to a vehicle containing said control device.

BACKGROUND

Vehicle-to-X communications is currently in a phase of development and standardization. This term is understood to mean in particular communication between vehicles (vehicle-to-vehicle communication) and communication between vehicles and infrastructure (vehicle-to-infrastructure communication)

WO 2010/139 526 A1 discloses a mobile ad hoc network referred to as a Car2X network, the nodes of which are certain road users such as vehicles, or other objects of the road such as traffic lights. The road users participating in the Car2X network can be provided with information about road conditions such as accidents, traffic jams, hazardous situations etc. via these networks.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The object is to improve the use of such mobile ad hoc networks.

According to one aspect of the invention, a method for generating a time stamp in a vehicle participating in a vehicular ad hoc network, which vehicle uses the time stamp to assign to an event sent in a message a time which is generated by updating a global timebase derivable from a global navigation satellite signal, referred to as a GNSS signal, comprises verifying whether a GNSS signal can be received, and generating the time on the basis of a local timebase if there are an insufficient number of global navigation satellite signals available to derive the global timebase.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

In the figures, the same technical elements are denoted by the same reference signs and are described only once.

Figure 1:
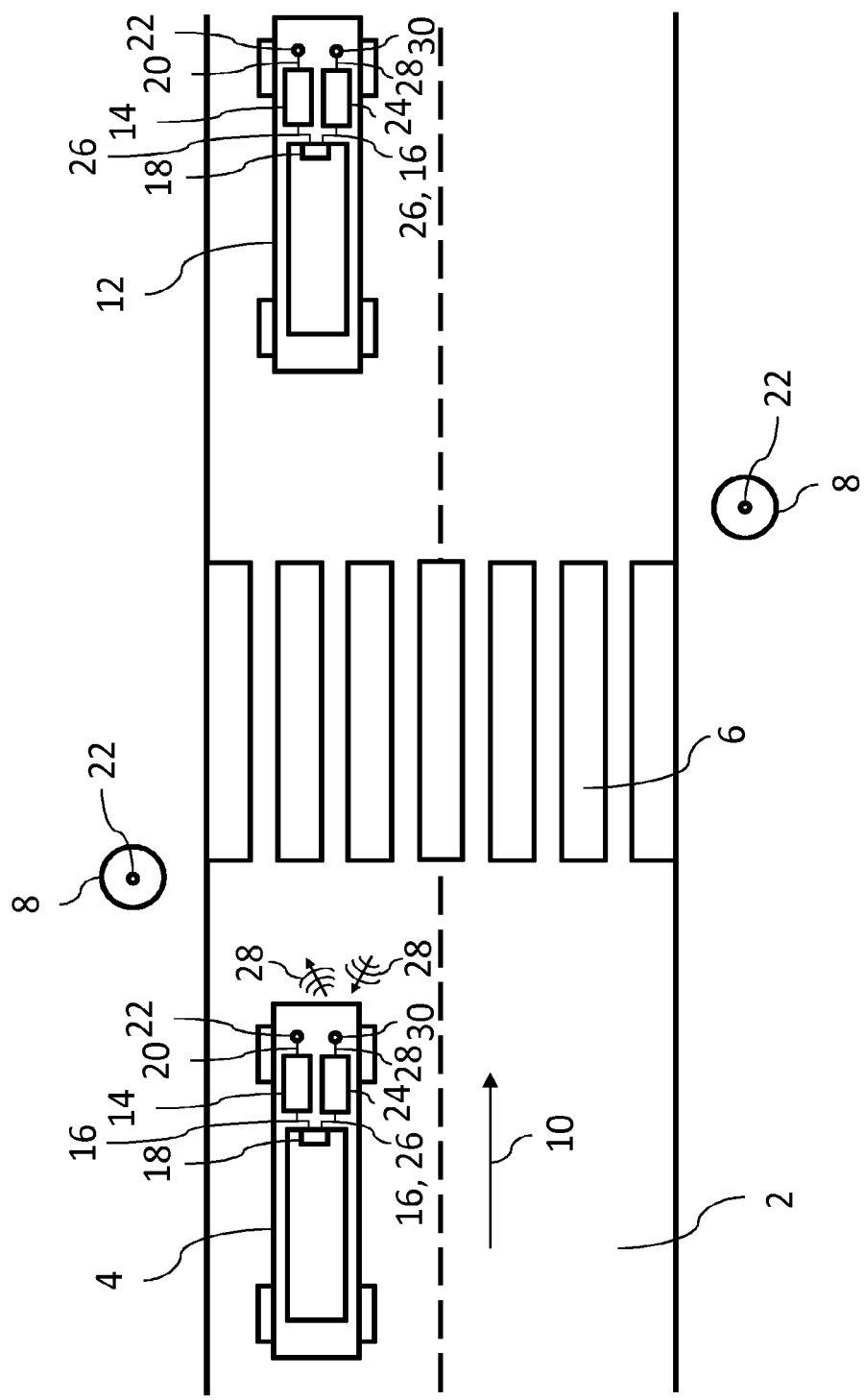
FIG. 1 is a block diagram of a vehicle traveling on a road.

Reference is made to FIG. 1, which shows a block diagram of a vehicle 4 traveling on a road 2.

In the present embodiment, there is meant to be a pedestrian crossing 6 on the road 2, at which traffic lights 8 are used to control whether the vehicle 4 on the road 2 is allowed to cross over the pedestrian crossing 6, or a pedestrian (not shown) is allowed to cross the road 2 on the pedestrian crossing 6.

FIG. 1 shows in front of the vehicle 4 in a travel direction 10 another vehicle 12, which is moving in the same travel direction 10 in which the vehicle 4 is also moving.

In the present embodiment, the vehicle 4 comprises a receiver 14 for a global navigation satellite system (GNSS), referred to below as a GNSS receiver 14, by means of which the vehicle 4 can determine in a manner known per se data on time and position in the form of its absolute geographical location 16, and can use said data, for instance as part of a navigation system 18, in order to display said data on a geographical map (not shown). Relevant signals 20 from the global navigation satellite system, referred to below as GNSS signals 20, which are sent from a satellite 19 shown in FIGS. 2 to 4, can be received, for example, via a suitable GNSS antenna 22 and forwarded to the GNSS receiver in a manner known per se.

In the present embodiment, the vehicle also comprises a transmitter 24, by means of which the vehicle can form a vehicular ad hoc network, known as a Car2X network, with the other vehicle 12 and/or the traffic lights 8, and exchange therewith messages 28 in which the vehicles 4, 12 can inform one another about events that occur. This transmitter 24 shall be referred to below as the Car2X transmitter 24, to distinguish it from the GNSS receiver 14. An event that is regularly exchanged in such messages 28 is the particular position data of the respective vehicles 4, 12 in the form of their absolute geographical location 16, 26. This means that the vehicle 4 can use its Car2X transmitter 24 to transmit its absolute geographical location 16 to the other vehicle 12 in a message 28, and its geographical location 26 can be received by the other vehicle 12 in a message 28. These messages 28 are received and sent in this case via a Car2X antenna 30.

It should be pointed out here that within a Car2X network, numerous other events, which are specified in region-specific standards, can be exchanged between the individual network nodes. The payload that can be exchanged is standardized, inter alia, under the ETSI TC ITS for European Telecommunications Standards Institute (ETSI) in Europe, and under IEEE 1609 for the Institute of Electrical and Electronics Engineers (IEEE) and Society of Automotive Engineers (SAE) in the United States of America. For the sake of simplicity, however, the example case shall be used in which are transmitted the absolute locations 16, 26 that the individual nodes of the Car2X network can display, for example, on the navigation systems 18. Car-to-X or Vehicleto-X communications can also be referred to as C2X or V2X communications. The subdomains can be referred to as C2C (Car-to-Car), V2V (Vehicle-to-Vehicle), C2I (Car-to-Infrastructure) or V2I (Vehicle-to-Infrastructure).

Finally, the traffic lights 8 can also be designed to send their geographical location via a Car2X antenna 22, in a manner which is not shown. Although the absolute geographical location of the traffic lights 8 could be determined via an aforementioned GNSS system, since the traffic lights 8 do not move, their absolute geographical location can be fixed once and, for instance, stored in an internal memory of the traffic lights 8, hence dispensing with a dedicated costly GNSS system.

Figure 2:
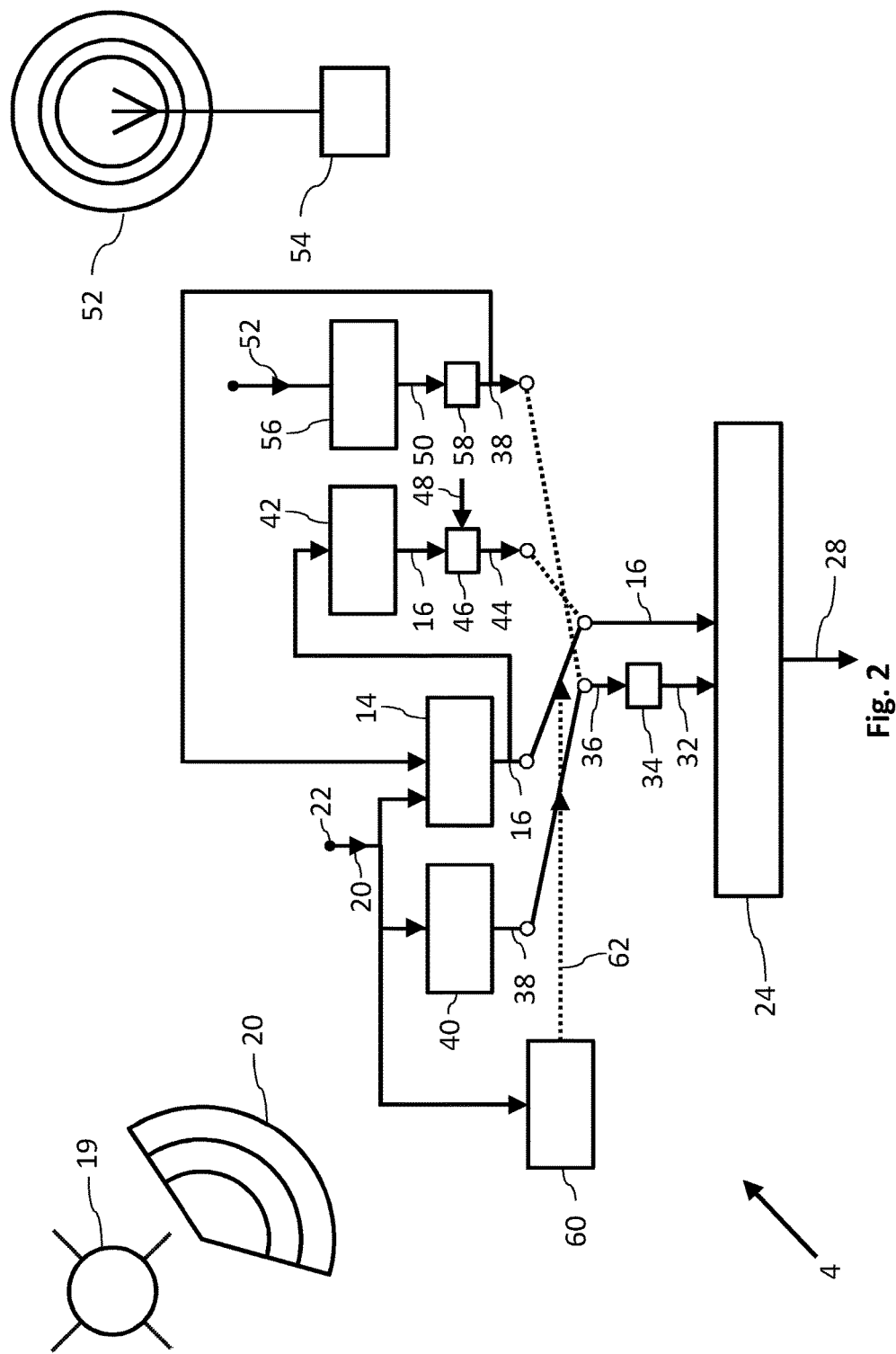
FIG. 2 is a block diagram of a part of the vehicle of FIG. 1, which part is intended to send Car2X messages.

In order that the receivers in the Car2X network can also evaluate meaningfully the events sent by the vehicles 4, 12 in the messages 28, for instance events such as their geographical locations 16, 26, a time 32, shown in FIG. 2, at which the event contained in the message 28 took place must also be known in addition to these events. For the example of the geographical location 16 of the vehicle 4, this means that in the message 28 must additionally be transmitted the time 32 at which the vehicle 4 sending the message 28 was located at the sent geographical location 16.

Technically, the time 32 can be defined by a time generator 34. Such time generators 34, however, can use oscillatory systems such as a crystal oscillator or the like only to define time differences. In order to generate the time 32, however, a timebase 36 must be defined for the time generator 34, on the basis of which it can output the time 32. In order that the time 32 output by the time generator 34 is used consistently by all the nodes communicating in the Car2X network, the timebase 36 should be defined identically for all the nodes participating in the Car2X network. A global timebase 36 of this type, which is interpreted in the same way everywhere in the world, can be found in the GNSS signals 20, because in the GNSS system, a plurality of satellites send corresponding GNSS signals 20 containing a time, and the GNSS receiver 14 is able to derive the absolute location 16 of the vehicle 4 in a manner known per se by trilateration of various differences in the transit time of individual GNSS signals 20. Thus if the absolute location 16 of the vehicle 4 is known from the individual GNSS signals 20, then the transit time of a single GNSS signal 20 can be used as the basis from which to calculate the time defined by the corresponding GNSS satellite, which then in turn can be used as the global timebase 38 for the time 32.

In principle, this determination of the global timebase 38 can equally be performed in the GNSS receiver 14. For the sake of clarity, FIG. 2 shows a unit 40, which is actually redundant to the GNSS receiver 14, for defining the global timebase 38.

Normally, this global timebase 38 is input to the time generator 34 as the timebase 36. Doing this in all the nodes 4, 8, 12 of the Car2X network guarantees that the time 32 generated in this manner runs synchronously in all the nodes 4, 8, 12, and the events sent in the Car2X network can be placed at a correct time.

Once the timebase has been initialized correctly, then even with the GNSS signals cut off, the global timebase can still be continued on the basis of the running system time.

Problems arise, however, if too few GNSS signals 20 are available and hence a global timebase 38 is also unavailable. If, for example, the vehicle 4 is started in a parking garage that screens out the GNSS signal(s) 20, then neither the global location 16 nor the time 32 can be determined, because no global timebase 38 is available.

According to the present exemplary embodiment, it is proposed in this case to store in a memory 42 the absolute position 16 of the vehicle 4 before switching off the vehicle 4. The memory 42 can then be read after starting the vehicle 4. If after a plausibility check it is established that the vehicle 4 must still be located in the absolute location 16 stored in the memory 42, then this absolute location 16 continues to be used as the reference location for calculating the actual location 44, for instance in a location recorder 46 on the basis of the location change 48 of the vehicle 4 detectable using sensors, until the GNSS signal(s) 20 are available again. This actual location 44 is then used to generate the messages 28.

To generate the time 32, recourse is made instead to a local timebase 50. This can be derived from any source. Unlike the global timebase 38, however, the local timebase 50 is valid only in the region in which the local timebase 50 was received, and may need to be converted in order to be able to be used as a timebase 36 for the time generator 34. It is intended according to FIG. 2 that as a basis for the local timebase 50, a radio signal 52 is received from a time-signal transmitter 54, from which signal the local timebase 50 is then derived in a suitable unit 56. If the time signal transmitter 54 is the DCF77, for example, then the Central European Time (CET) would be received as the local timebase 50, which then advantageously should initially be converted in a conversion unit 58 into the global timebase 38 used by the GNSS system.

In the present exemplary embodiment, a detection unit 60 determines purely by way of illustration if GNSS signals 20 are available and if so how many. Depending on the result, the detection unit uses a switching signal 62 to select the global timebase 38 derived from the GNSS signal 20 or the global timebase 38 derived from the radio signal 52 as a timebase 36 for the time generator 34. The detection unit correspondingly also uses the switching signal 62 to select the global location 16 from the GNSS signal or the calculated actual location 44.

The global timebase 38 output from the conversion unit 58 can also be input to the GNSS receiver 14, in order to speed up, in a manner similar to the Assisted Global Positioning System (A-GPS), locating the GNSS signals 20 using the GNSS receiver 14 and its initialization.

Figure 3:
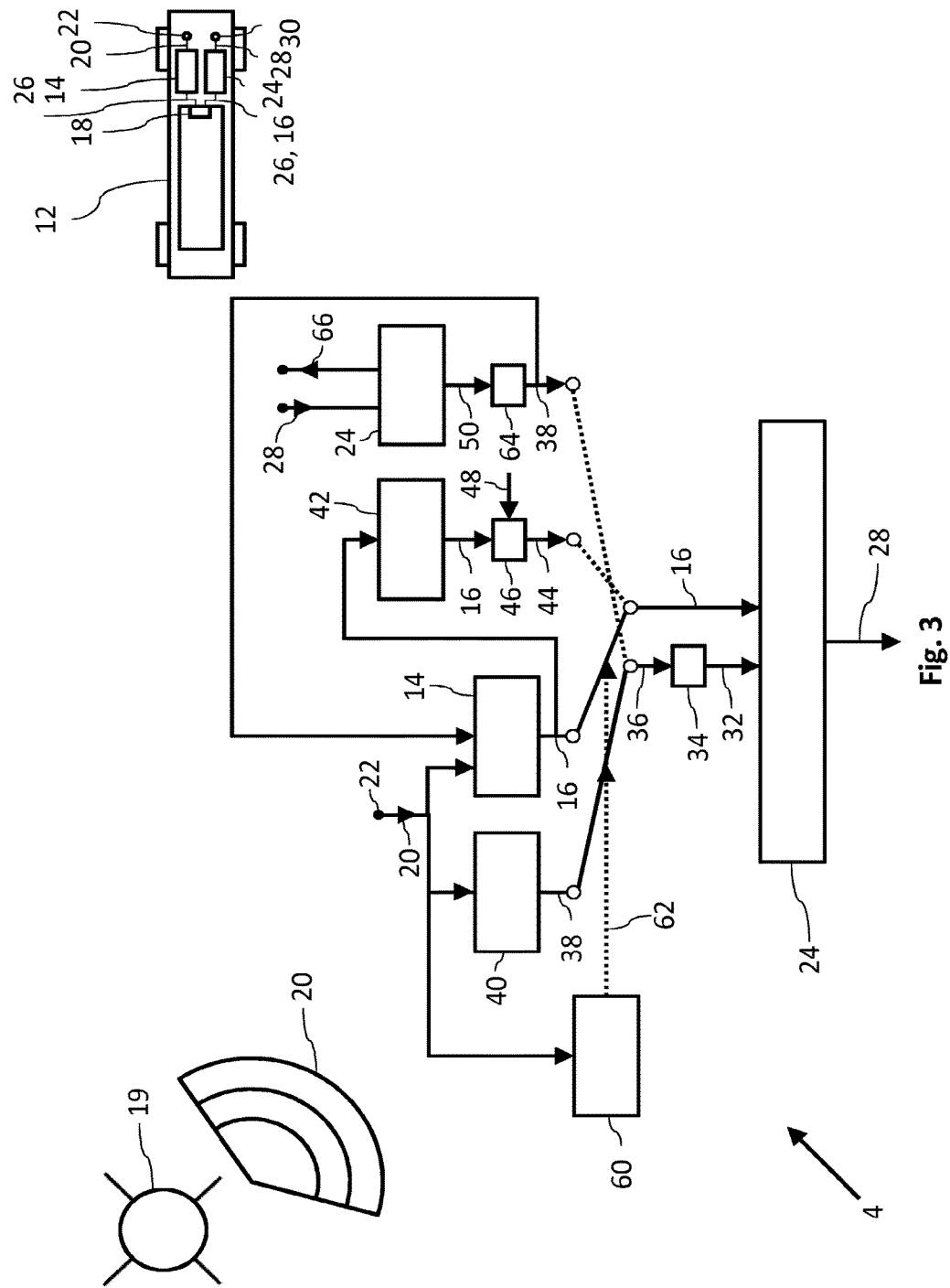
FIG. 3 is a block diagram of an alternative part of the vehicle of FIG. 1, which part is intended to send Car2X messages.

According to FIG. 3, the global timebase 38 can also be derived from messages 28 received from the other vehicle 12. FIG. 3 shows the GNSS transmitter 24 split into two different units purely for the sake of clarity. First, the local timebase 50 of the other vehicle 12 is received from the message 28. This local timebase 50, however, must be corrected, for example for transit times, in a correction unit 64 in order to obtain the global timebase 38. In order to reduce the data traffic, the vehicle 4 can use a request message 66 to ask the other vehicle 12 to send a message containing the global timebase 38.

Figure 4:
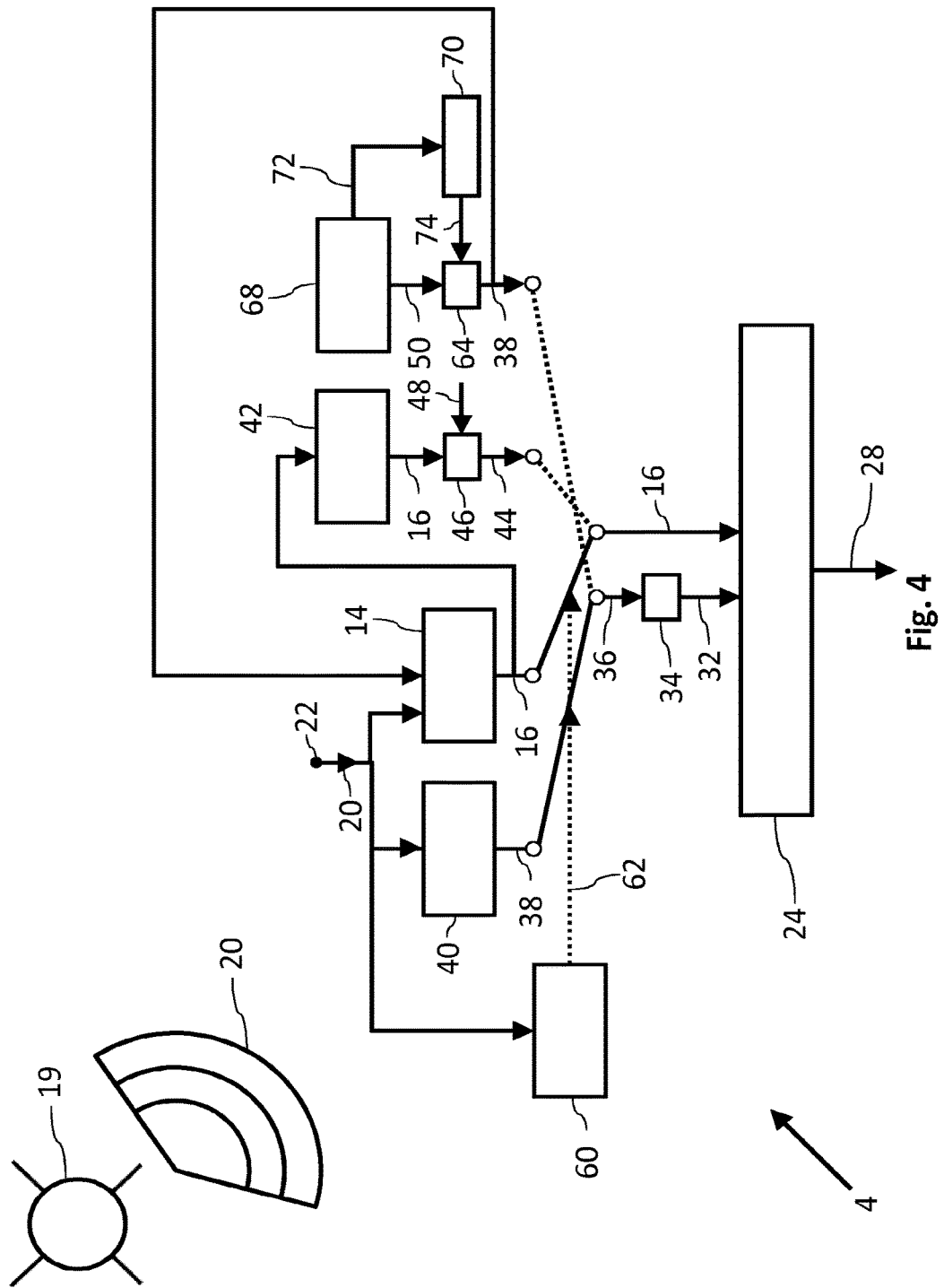
FIG. 4 is a block diagram of yet another alternative part of the vehicle of FIG. 1, which part is intended to send Car2X messages.

According to FIG. 4, a vehicle clock 68 of the vehicle 4 can also be read in order to determine the global timebase 38. The vehicle clock 68 outputs a local timebase 50 for the vehicle, which then is converted, again in the correction unit 64, for example from the Central European Time into the global timebase 38. Particularly advantageously, a tamper detection unit 70 is provided, which retrieves modification information 72 from the vehicle clock 68. If the modification information 72 shows that the vehicle clock 68 has been tampered with since the GNSS signal(s) 20 were last received, the conversion from the local timebase 50 into the global timebase 50 is inhibited by an inhibit signal 74.

The defined method is based on the idea that messages transmitted via a vehicular ad hoc network, for instance a network such as the Car2X network, are normally used to inform the nodes of the vehicular ad hoc network, i.e. other vehicles, about events such as accidents, traffic jams, roadworks, etc. For the other vehicles to be able to evaluate and process further these events correctly, however, said events need a time reference that must be identical for all vehicles. Without this time reference for the occurrence of the event, transmitted messages are hence of no use in the vehicular ad hoc network because they cannot be evaluated by the other nodes.

This time reference is produced by the generated time stamps, which assign to the events sent in the messages the time at which the event occurred. In order that all the nodes of the vehicular ad hoc network interpret the time in the same way, however, the time for all the nodes of the vehicular ad hoc network must be synchronized between the nodes. A global timebase is used for this purpose, on the basis of which all the nodes of the vehicular ad hoc network can generate a standard time. The global timebase may be the Coordinated Universal Time (UTC), for instance.

A system-independent, global timebase of this type is used in global navigation satellite systems, otherwise known as GNSS systems. In these systems, individual satellites in a global navigation satellite system transmit position signals known as GNSS signals, and the receiver can use trilateration to determine its global position uniquely from the differences in transit time of these GNSS signals. The global timebase transmitted using GNSS signals and determined by the position solution is therefore a standard value everywhere in the world. The most well-known examples of such global navigation satellite systems are the Global Positioning System, GPS for short, of the United States of America, the Глобальная навигационная спутниковая система, GLONASS for short, of the Russian Federation, the Galileo system of the European Union or the Beidou system from China.

In order to be able to use the time and hence the time stamp for communication in the vehicular ad hoc network, after the system start-up of the vehicle and hence of a transmitter that allows participation in the vehicular ad hoc network, the global timebase must first be determined by means of the GNSS. Under the GPS system, for example, the aforementioned Coordinated Universal Time, for instance, is used as the global timebase, which to be determined using GPS requires at least four GPS signals to be received. Once the global timebase is determined, the transmitter can update the time by extrapolation until the next GNSS reception. Extrapolation errors arising from clock drift caused by crystal errors, for example, and amounting to a few picoseconds over a short period are negligible in this case.

If, however, there is inadequate GNSS reception available at the system start-up because the vehicle is started in a tunnel or a parking garage, there is also no global timebase available from which the time could be generated. Thus the vehicle also cannot participate in the vehicular ad hoc network because the messages sent by the vehicle without a time reference are useless, as already explained.

Whereas relative values such as the acceleration of the vehicle, heading change, the speed and/or position change of the vehicle can be determined by (relative) sensors on-board the vehicle, this is not possible for absolute values such as the aforementioned time, the position of the vehicle and/or the heading of the vehicle. Although some of these absolute values, such as the position and the heading of the vehicle, could be saved and reused after an initial plausibility check, this is not possible for the time.

One method having the idea of using temporarily a local timebase instead of the unavailable global timebase, it then being necessary in this case to take into account any clock errors arising from the different timebases between the individual vehicles participating in the vehicular ad hoc network. During the time in which no global timebase is available, the vehicle can thereby still participate in the vehicular ad hoc network and both send evaluable messages in the network and itself evaluate received messages.

If the vehicle is started before verifying whether the GNSS signal can be received, the local timebase can be, for example, a time updated before the vehicle is started. Admittedly this would require that, in order to be able to update the time, the system for generating the time also remains in operation when the vehicle itself is not running and is not operated. In this case, however, it would be possible to dispense with storing data because the system remains continuously active and detects any changes. If applicable, this might also justify greater electricity consumption while the vehicle is not running, although particular requirements for a system restart of the vehicle might also be needed. Whether or not this development is viable might also depend on the size of the time errors arising during prolonged periods as a result of the clock drift.

Alternatively or additionally, the local timebase could also be retrieved from a clock that outputs a local time. In this case it is irrelevant whether this clock is located in the vehicle itself, in another node of the vehicular ad hoc network or in any other location. The transmission of the local time from this clock to the vehicle is also immaterial. For example, the time could be retrieved from a clock fitted inside the vehicle but outside the aforementioned transmitter, which clock is referred to simply as the vehicle clock. This clock is normally also kept going when the vehicle is not running, and can therefore be used as the local timebase.

In order to ensure that the local timebase from the vehicle clock is not adjusted in an unknown way, a development of the defined method can comprise the following steps: retrieving modification information, which is designed to indicate a modification time instant at which the clock was last modified, and preventing the time being generated by means of updating the local clock if the modification time instant lies after a last receive time instant at which a GNSS signal was last received. If the time from the vehicle clock is confirmed as valid on last receiving the GNSS signal, then the modification information can be used to indicate an adjustment to the vehicle clock, by means of which the time of the vehicle clock can be identified as invalid and hence unsuitable for use as the local timebase. Alternatively, for instance when switching to summer time and winter time, the change can be included in the modification information, in which case then instead of preventing the time being generated by updating the local clock, the time from the vehicle clock that is used as the local timebase can be corrected by the change.

In another development of the defined method, the clock providing the local timebase can be designed to transmit the local time in a radio signal. This radio signal can be sent, for example, by another node of the vehicular ad hoc network. Alternative sources of the radio signal would be a telephone connection and/or Internet connection, a wireless signal, a radio clock signal such as the DCF77 signal, or a signal from another wireless network such as a WLAN.

Particularly, the local time can be transmitted in a radio signal by another node of the vehicular ad hoc network. This would need neither additional add-on hardware nor particular requirements for the vicinity, because the local timebase can be transmitted directly by means of communication in the vehicular ad hoc network using the transmitted/received messages. Although this would require other nodes of the vehicular ad hoc network to be in the vicinity, a vehicular ad hoc network without other nodes is practically pointless anyway in most cases.

In addition, according to the present development of the defined method, it can be assumed that the accuracy of the time information of the local timebase received in this way is sufficiently high, because the local timebase transmitted by the other node of the vehicular ad hoc network is based on the global timebase.

In order to implement the transmission of the local timebase between the nodes of the vehicular ad hoc network, two basic principles would be possible in theory.

According to one method it comprises the step of requesting the radio signal containing the local timebase from the other node of the vehicular ad hoc network. For this purpose, special synchronization messages could be exchanged between the nodes of the vehicular ad hoc network. These synchronization messages ensure that the vehicle can synchronize its timebase in the vehicular ad hoc network on the basis of the timebase of other nodes in the vehicular ad hoc network even when no payload data is being sent in this network. In theory, these synchronization messages could be sent in any manner, for instance also at fixed intervals. The channel load is reduced, however, by requesting the radio signal containing the local timebase. This case can also be referred to as asynchronous transmission of the radio signal containing the local timebase. The asynchronous exchange of the aforementioned synchronization messages could be based on the Precision Time Protocol (PTP), for example.

According to another embodiment, the local time is a time stamp generated by the other node of the vehicular ad hoc network. In this case, if possible a plurality of time stamps from different nodes of the vehicular ad hoc network should be taken into account in acquiring the local timebase, because then the time errors in the local timebase with respect to the actual global timebase can be minimized. On the basis of the received messages from the vehicular ad hoc network, it is then possible to use the received time stamps, if applicable weighted according to an accuracy of the particular time stamp, which accuracy is specified in the messages, and a typical signal transit time to make a rough time estimate of the current time in the vehicular ad hoc network, which time is based on the global timebase, and hence of the local timebase. Although the local timebase determined in such a way does not achieve the high accuracy of the global timebase, it still lies within a tolerance which, using the existing hardware, allows time-synchronization with sufficient accuracy for participation in the vehicular ad hoc network.

According to another aspect of the invention, a method for locating a vehicle on the basis of a GNSS signal received in the vehicle from a satellite, comprises the steps: determining a local timebase using one of the previous methods; receiving the GNSS signal from the satellite; and locating the vehicle on the basis of the local timebase and the GNSS signal.

In this method, the timebase can be used directly or indirectly for implementing a warm-start of the receiver, for instance by converting said timebase initially into the global timebase and transmitting said timebase to the GNSS receiver together with further information such as almanac and position. The selection itself can be made, for example, in a similar way to the Assisted Global Positioning System (A-GPS), and speeds up considerably the initialization of the GNSS localization system.

According to another aspect, a control device is designed to implement a method as claimed in any of the preceding claims.

In a development of the defined control device, the defined device comprises a memory and a processor. The defined method is stored in the form of a computer program in said memory, and said processor is intended to perform the method when the computer program is loaded from the memory into the processor.

According to another aspect, a computer program comprises program code means for performing all the steps of one of the defined methods when the computer program is executed on a computer or in one of the defined devices.

According to another aspect, a computer program product contains a program code, which is stored on a machine-readable data storage medium and which, when executed in a data processing device, performs one of the defined methods.

According to another, a vehicle comprises a defined control device.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for generating a time stamp in a vehicle participating in a vehicular ad hoc network, the method comprising:
    determining a global timebase based on one or more GNSS signals received at a vehicle antenna from a GNSS;
    determining a time based on the global timebase associated with the received one or more GNSS signals;
    when the vehicle antenna fails to receive the one or more GNSS signals from the GNSS:
        receiving a radio signal from a time-signal transmitter or a message from another vehicle in communication with the vehicle, the radio signal associated with a local timebase of the time-signal transmitter or the other vehicle;
        adjusting the received local timebase;
        determining the global timebase based on the adjusted local timebase; and
        determining the time based on the global timebase associated with the received radio signal or the received message; and
    sending a transmit message including an event, the transmit message associated with the time.

2. The method of claim 1, wherein the vehicle is started before verifying whether the GNSS signal can be received, and the local timebase is a time updated before the vehicle is started.

3. The method of claim 1, further comprising retrieving the local timebase from a clock that outputs a local time.

4. The method of claim 3, comprising:
    retrieving modification information, which indicates a modification time instant at which the clock was last modified; and
    preventing the time being generated when the modification time instant lies after a last receive time instant at which a GNSS signal was last received.

5. The method of claim 3, wherein the clock transmits the local time in a radio signal.

6. The method of claim 5, wherein the local time is transmitted in a radio signal by another node of the vehicular ad hoc network.

7. The method of claim 6, comprising requesting the radio signal from the other node of the vehicular ad hoc network.

8. The method of claim 6, wherein the local time is a time stamp generated by the other node of the vehicular ad hoc network.

9. The method of claim 1, comprising locating the vehicle on the basis of the local timebase and the GNSS signal.

10. A control device configured to implement instructions for processing a vehicle-to-X message, the instructions comprising:
   determining a global timebase based on one or more GNSS signals received at a vehicle antenna from a GNSS;
   determining a time based on the global timebase associated with the received one or more GNSS signals;
   when the vehicle antenna fails to receive the one or more GNSS signals from the GNSS:
      receiving a radio signal from a time-signal transmitter or a message from another vehicle in communication with the vehicle, the radio signal associated with a local timebase of the time-signal transmitter or the other vehicle;
      adjusting the received local timebase;
      determining the global timebase based on the adjusted local timebase; and
      determining the time based on the global timebase associated with the received radio signal or the received message; and
   sending a transmit message including an event, the transmit message associated with the time.

11. The control device of claim 10, wherein the vehicle is started before verifying whether the GNSS signal can be received, and the local timebase is a time updated before the vehicle is started.

12. The control device of claim 10, further comprising instructions for retrieving the local timebase from a clock that outputs a local time.

13. The control device of claim 12, further comprising instructions for:
   retrieving modification information, which indicates a modification time instant at which the clock was last modified; and
   preventing the time being generated when the modification time instant lies after a last receive time instant at which a GNSS signal was last received.

14. The control device of claim 12, wherein the clock transmits the local time in a radio signal.

15. The control device of claim 14, wherein the local time is transmitted in a radio signal by another node of the vehicular ad hoc network.

16. The control device of claim 15, further comprising instructions for requesting the radio signal from the other node of the vehicular ad hoc network.

17. The control device of claim 15, wherein the local time is a time stamp generated by the other node of the vehicular ad hoc network.

18. The control device of claim 10, further comprising instructions for locating the vehicle on the basis of the local timebase and the GNSS signal.

* * * * *